US012626648B2

(12) United States Patent
Kim et al.

(10) Patent No.: US 12,626,648 B2
(45) Date of Patent: May 12, 2026

(54) DISPLAY DEVICE

(71) Applicant: LG Display Co., Ltd., Seoul (KR)

(72) Inventors: JinYeong Kim, Goyang-si (KR); WonJun Choi, Paju-si (KR); Hyunwoo Kim, Bucheon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/941,748

(22) Filed: Nov. 8, 2024

(65) Prior Publication Data

US 2025/0252898 A1 Aug. 7, 2025

(30) Foreign Application Priority Data

Feb. 1, 2024 (KR) ........................ 10-2024-0015763

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01); *G09G 2300/0852* (2013.01); *G09G 2310/08* (2013.01); *G09G 2330/08* (2013.01); *G09G 2330/10* (2013.01)

(58) Field of Classification Search
CPC ............. G09G 2300/0819; G09G 3/32; G09G 2300/0426; G09G 2310/08; G09G 2300/0852; G09G 2330/10; G09G 2330/08
See application file for complete search history.

(56) References Cited

U.S. PATENT DOCUMENTS

| | | | | |
|---|---|---|---|---|
| 2004/0104880 | A1 | 6/2004 | Kang et al. | |
| 2018/0096645 | A1* | 4/2018 | Lee | G09G 3/20 |
| 2020/0193914 | A1 | 6/2020 | Shin | |
| 2021/0366343 | A1* | 11/2021 | Oh | G09G 3/2003 |
| 2023/0048129 | A1 | 2/2023 | Kim et al. | |
| 2023/0079091 | A1* | 3/2023 | Yuan | G09G 3/3275 345/55 |

FOREIGN PATENT DOCUMENTS

| | | | |
|---|---|---|---|
| CN | 104977768 | A | 10/2015 |
| CN | 115581094 | A | 1/2023 |
| CN | 116386503 | A | 7/2023 |
| CN | 117275404 | A | 12/2023 |
| EP | 1764772 | A2 | 3/2007 |
| JP | 2004302400 | A | 10/2004 |
| JP | 2010267373 | A | 11/2010 |
| KR | 10-2020-0028563 | A | 3/2020 |
| KR | 20200034477 | A | 3/2020 |
| KR | 10-2020-0068509 | A | 6/2020 |
| WO | 2009013819 | A1 | 1/2009 |
| WO | 2018235130 | A1 | 12/2018 |

* cited by examiner

*Primary Examiner* — Muhammad N Edun
(74) *Attorney, Agent, or Firm* — Seed Intellectual Property Law Group LLP

(57) ABSTRACT

A display device is provided. A display device of one embodiment comprises a plurality of sub pixels, a plurality of data lines connected to each of the plurality of sub pixels, and a multiplexer (MUX) circuit connected to a pair of adjacent data lines among the plurality of data lines, the MUX circuit comprising a charge transistor connected to each of the pair of data lines, and a discharge transistor connected to each of the pair of data lines. Accordingly, the MUX circuit comprises the discharge transistor discharging a voltage of the data line, to reduce or minimize a failure of abnormal driving of sub pixels connected to a part of the data lines.

11 Claims, 9 Drawing Sheets

DISPLAY DEVICE

CROSS-REFERENCE TO RELATED APPLICATIONS

This application claims the priority of Korean Patent Application No. 10-2024-0015763 filed on Feb. 1, 2024, in the Korean Intellectual Property Office, the disclosure of which is incorporated herein by reference.

BACKGROUND

Technical Field

The present disclosure relates to a display device, and particularly, a display device using a light emitting diode (LED).

Description of the Related Art

Display devices used for a computer monitor, a TV, a mobile phone and the like include organic light emitting display (OLED) devices and the like emitting light on their own, and liquid crystal display (LCD) devices and the like requiring a separate light source.

Display devices have been applied to a wide range of devices such as a computer monitor, a TV and a personal mobile device, and research has been conducted into a display device that secures a reduction in volume and lightweight as well as having a wide display area.

In recent years, display devices including a light emitting diode (LED) draw public attention as a next-generation display device. LEDs are made of an inorganic material rather than an organic material, ensuring excellent reliability and a greater lifespan than a liquid crystal display device or an organic light emitting display device. Additionally, LEDs may ensure excellent light emission efficiency, excellent shock-resistance and excellent reliability as well as fast lighting speed and may display a high-luminance image.

BRIEF SUMMARY

Various embodiments of the present disclosure provide a display device that can alternately drive a pair of sub pixels emitting light of the same color.

Various embodiments of the present disclosure provide a display device that can alternately drive a plurality of sub pixels by using a multiplexer (MUX) circuit.

Various embodiments of the present disclosure provide a display device that can ensure a simplified structure of a data driver.

Various embodiments of the present disclosure provide a display device in which the number of a plurality of data pads can decrease.

Various embodiments of the present disclosure provide a display device in which the number of the plurality of data pads can decrease so that the number of channels decreases and which can ensure a simplified structure of the data driver.

Various embodiments of the present disclosure provide a display device that can ensure a simplified structure of the data driver and a simplified structure of the plurality of data pads, reducing costs.

Various embodiments of the present disclosure provide a display device that can discharge a voltage of a data line connected to a sub pixel that is not driven for a non-driving period to reduce or minimize a failure of abnormal driving of the sub pixel.

Various embodiments of the present disclosure provide a display device that can reduce or minimize a failure of non-emission of a part of sub pixels in a low gradation image.

Various embodiments of the present disclosure provide a display device in which another element can be disposed in a vacant space between a data line not connected to the MUX circuit and a data pad to use the surface area of a non-active area efficiently.

Technical benefits of the present disclosure are not limited to the above-mentioned benefits, and other benefits, which are not mentioned above, can be clearly understood by those skilled in the art from the following descriptions.

According to an aspect of the present disclosure, a display device comprises a plurality of sub pixels, a plurality of data lines connected to each of the plurality of sub pixels, and a MUX circuit connected to a pair of adjacent data lines among the plurality of data lines, the MUX circuit comprising a charge transistor connected to each of the pair of data lines, and a discharge transistor connected to each of the pair of data lines. Accordingly, the MUX circuit comprises the discharge transistor discharging a voltage of the data line, to reduce or minimize a failure of abnormal driving of sub pixels connected to a part of the data lines.

According to another aspect of the present disclosure, a display device comprises a substrate configured to include an active area and a non-active area, a plurality of data lines configured to extend from the non-active area to the active area, a plurality of data pads disposed in the non-active area, and a plurality of MUX circuits disposed in the non-active area and connected between the plurality of data lines and the plurality of data pads, each of the plurality of MUX circuits comprising a plurality of first charge transistors connected to a part of the plurality of data lines, a plurality of second charge transistors connected to a rest of the plurality of data lines, a plurality of first discharge transistor connected to the part of the plurality of data lines, and a plurality of second discharge transistors connected to the rest of the plurality of data lines, wherein the plurality of first charge transistors and the plurality of first discharge transistors are turned on for a different period, and the plurality of second charge transistors and the plurality of second discharge transistors are turned on for a different period. Accordingly, the MUX circuit may be used to alternately drive a plurality of sub pixels connected to a part of data lines and a plurality of sub pixels connected to a rest of the data lines.

Other detailed matters of the exemplary embodiments are included in the detailed description and the drawings.

According to the present disclosure, the display device may alternately drive a pair of sub pixels emitting light of the same color.

According to the present disclosure, the display device may alternately drive a plurality of sub pixels by using the MUX circuit.

According to the present disclosure, the display device may secure a simplified structure of the data driver.

According to the present disclosure, the display device may have a simplified structure with a decrease in the number of the plurality of data pads.

According to the present disclosure, the display device may ensure a decrease in the number of channels with a decrease in the number of the plurality of data pads, and secure a simplified structure of the data driver and a reduction in costs.

According to the present disclosure, the display device may reduce or minimize a failure of abnormal driving of the sub pixels by discharging the voltage of the data lines.

According to the present disclosure, the display device may reduce a failure of non-emission of a part of sub pixels in a low gradation image.

According to the present disclosure, the display device may enable another element to be disposed in a vacant space between a data line not connected to the MUX circuit and a data pad to use the surface area of the non-active area efficiently.

The effects according to the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
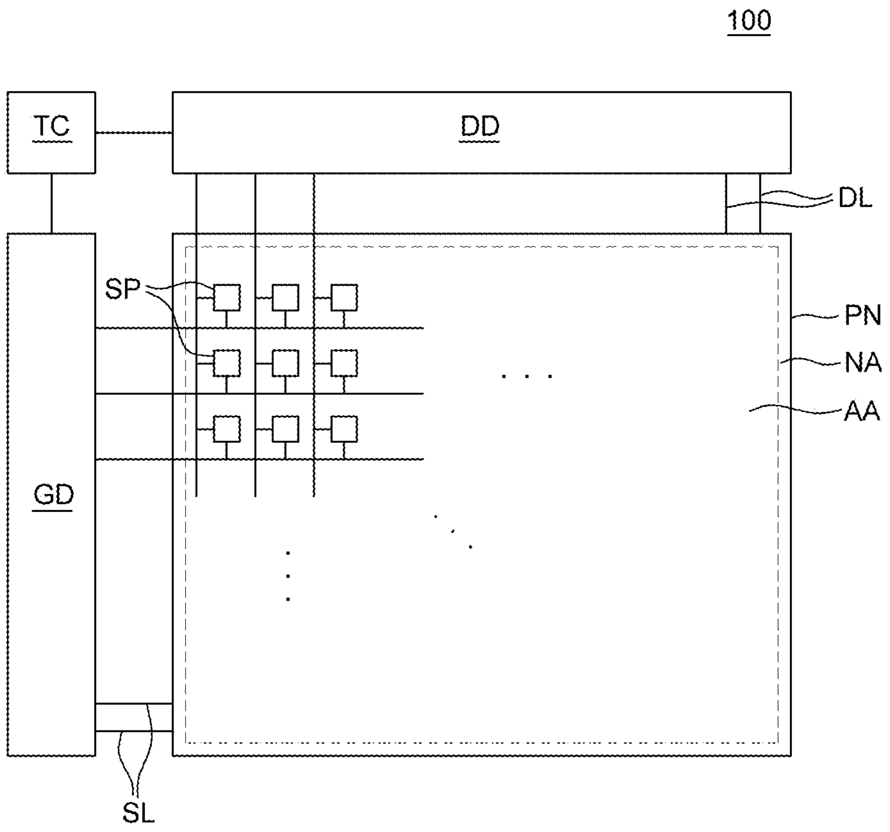
FIG. 1 is a schematic diagram of a display device of one embodiment.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or layer or therebetween.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

FIG. 1 is a schematic diagram of a display device of one embodiment. In FIG. 1, among a variety of elements of a display device 100, a display panel PN, a gate driver GD, a data driver DD and a timing controller TC are only illustrated for convenience of description.

Referring to FIG. 1, the display device 100 comprises a display panel PN comprising a plurality of sub pixels SP, a gate driver GD and a data driver DD providing various types of signals to the display panel PN, and a timing controller TC controlling the gate driver GD and the data driver DD.

The gate driver GD provides a plurality of scan signals to a plurality of scan lines SL according to a plurality of gate control signals provided from the timing controller TC. In FIG. 1, one gate driver GD is disposed at one side of the display panel PN in such a way that the gate driver GD is spaced from the display panel PN, but the number and disposition of the gate drivers GD are not limited thereto.

The data driver DD converts image data, input from the timing controller TC according to a plurality of data control signals provided from the timing controller TC, to a data voltage by using a reference gamma voltage. The data driver DD may provide the converted data voltage to a plurality of data lines DL.

The timing controller TC aligns image data input from the outside and provides the image data to the data driver DD. The timing controller TC may generate a gate control signal and a data control signal by using a synchronization signal input from the outside, e.g., a dot clock signal, a data enable signal, and a horizontal/perpendicular synchronization signal. Additionally, the timing controller TC may provide the generated gate control signal and data control signal respectively to the gate driver GD and the data driver DD, to control the gate driver GD and the data driver DD.

The display panel PN as an element for displaying an image to the user comprises a plurality of sub pixels SP. In the display panel PN, the plurality of scan lines SL and the plurality of data lines DL cross each other, and each of the plurality of sub pixels SP connects to the scan line SL and the data line DL. In addition, though not illustrated in the drawing, each of the plurality of sub pixels SP may connect to a high potential power line VDD, a low potential power line VSS, a reference line RL and the like.

In the display panel PN, an active area AA and a non-active area NA surrounding the active area AA are defined.

The active area AA is an area where an image is displayed, in the display device 100. In the active area AA, a plurality of sub pixels SP constituting a plurality of pixels and a circuit for driving the plurality of sub pixels SP may be disposed. The plurality of sub pixels SP is a minimum unit constituting the active area AA, and n numbers of sub pixels SP may constitute one pixel. In each of the plurality of sub pixels SP, a light emitting diode 130 and a thin film transistor for driving a light emitting diode 130, and the like may be disposed. A plurality of light emitting diodes 130 may be defined in a different way, depending on the sort of display panel PN. For example, in the case where the display panel PN is an inorganic light emitting display panel PN, the light emitting diode 130 may be a light-emitting diode (LED) or a micro light-emitting diode (LED).

In the active area AA, a plurality of lines supplying various types of signals to the plurality of sub pixels SP are disposed. For example, the plurality of lines may comprise a plurality of data lines DL providing a data voltage to each of the plurality of sub pixels SP, a plurality of scan lines SL providing a scan signal to each of the plurality of sub pixels SP, and the like. The plurality of scan lines SL may extend in one direction and connect to the plurality of sub pixels SP in the active area AA, and the plurality of data lines DL may extend in a direction different from the one direction and connect to the plurality of sub pixels SP in the active area AA. In addition, in the active area AA, a low potential power line VSS, a high potential power line VDD and the like may be further disposed, and not limited thereto.

The non-active area NA may be an area where an image is not displayed, and defined as an area extending from the active area AA. In the non-active area NA, a link line and a pad electrode for supplying signals to the sub pixels SP of the active area AA or a driving IC (Integrated Circuit) such as a gate driver IC and a data driver IC, and the like may be disposed.

However, the non-active area NA may be placed on the back surface of the display panel PN, i.e., on a surface with no sub pixel SP, or may be omitted, and may not be limited to the one illustrated in the drawing.

Additionally, a driver such as a gate driver GD, a data driver DD and a timing controller TC may connect to the display panel PN in various ways. For example, the gate driver GD may be mounted in the non-active area NA, based on the Gate In Panel (GIP) method, or mounted among the plurality of sub pixels SP in the active area AA, based on the Gate In Active (GIA) area method.

For example, the data driver DD and the timing controller TC may be formed on a separate flexible film and printed circuit board, and the flexible film and the printed circuit board may be bonded to the pad electrode formed in the non-active area NA of the display panel PN, so that the data driver DD and the timing controller TC may connect to the display panel PN electrically.

Additionally, in the case where the gate driver GD is mounted based on the GIP method, and the data driver DD and the timing controller TC supply a signal to the display panel PN through the pad electrode of the non-active area NA, a predetermined level or above of the surface area of the non-active area NA is required to dispose the gate driver GD and the pad electrode, and accordingly, a bezel may increase.

In another example, in the case where the gate driver GD is mounted in the active area AA, based on the GIA method, and a side line SRL connecting signal lines on the front surface of the display panel PN with the pad electrode on the back surface of the display panel PN is formed so that the flexible film and the printed circuit board are bonded to the back surface of the display panel PN, the non-active area NA on the front surface of the display panel PN may be reduced or minimized. That is, in the case where the gate driver GD, the data driver DD and the timing controller TC connect with the display panel PN in the above-described way, a zero bezel substantially having no bezel may be embodied.

Hereinafter, the sub pixel SP of the display device 100 of one embodiment is specifically described with reference to FIGS. 2-4.

Figure 2:
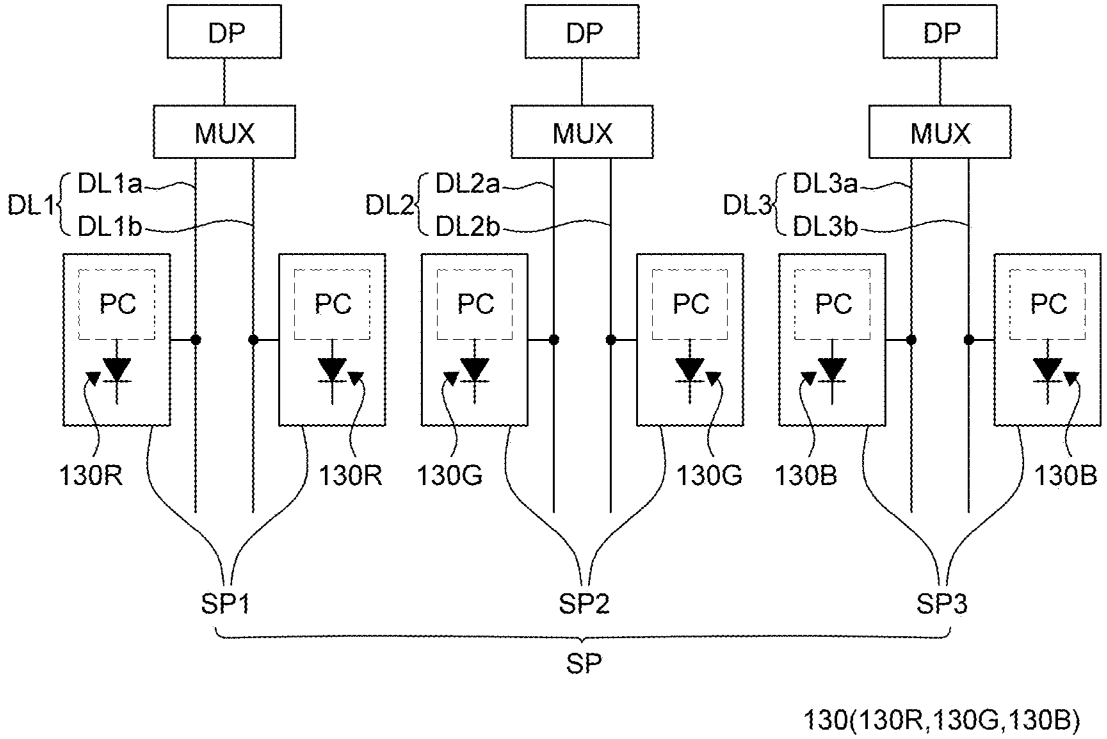
FIG. 2 is a schematic block diagram of a sub pixel and a MUX circuit of the display device of one embodiment.

FIG. 2 is a schematic block diagram of a sub pixel and a MUX circuit of the display device of one embodiment. FIG. 3 is an exemplary circuit diagram of the sub pixel of the display device of one embodiment. FIG. 4 is another exemplary circuit diagram of the sub pixel of the display device of one embodiment.

Referring to FIG. 2, the plurality of sub pixels SP may comprise a plurality of first sub pixels SP1, a plurality of second sub pixels SP2 and a plurality of third sub pixels SP3. For example, the first sub pixel SP1 may be a red sub pixel SP, the second sub pixel SP2 may be a green sub pixel SP, and the third sub pixel SP3 may be a blue sub pixel SP, but not limited thereto.

A pair of first sub pixels SP1 may be adjacent to each other, a pair of second sub pixels SP2 may be adjacent to each other, and a pair of third sub pixels SP3 may be adjacent to each other. Accordingly, in the same row, the pair of first sub pixels SP1, the pair of second sub pixels SP2 and the pair of third sub pixels SP3 may be disposed consecutively.

Each of the plurality of sub pixels SP comprises a pixel circuit PC and a light emitting diode 130. The pixel circuit PC as a circuit for driving the light emitting diode 130 may comprise a plurality of transistors and capacitors. The pixel circuit PC may connect to a variety of lines such as a scan line SL, a data line DL, a high potential power line VDD, a lower potential power line VSS, a light emission control signal line EL and the like, and receive a signal from them so that the pixel circuit PC may be driven. The pixel circuit PC may supply driving current to the light emitting diode 130 so that the light emitting diode 130 may emit light.

The light emitting diode 130 may receive driving current from the pixel circuit PC and emit light. The light emitting diode 130, for example, may be a micro light-emitting diode (LED) or a light-emitting diode (LED). The light emitting diode 130 may connect between the pixel circuit PC and the high potential power line VDD, or between the pixel circuit PC and the low potential power line VSS.

The light emitting diode 130 comprises a first light emitting diode 130R, a second light emitting diode 130G, and a third light emitting diode 130B. The first light emitting diode 130R may be disposed in the first sub pixel SP1, the second light emitting diode 130G may be disposed in the second sub pixel SP2, and the third light emitting diode 130B may be disposed in the third sub pixel SP3. For example, the first light emitting diode 130R may be a red light emitting diode 130, the second light emitting diode 130G may be a green light emitting diode 130, and the third light emitting diode 130B may be a blue light emitting diode 130, but not limited thereto.

Additionally, a data line DL connects to each of the plurality of sub pixels SP. The data line DL comprises a first data line DL1, a second data line DL2 and a third data line DL3. For example, the first data line DL1 may connect to the first sub pixel SP1, the second data line DL2 may connect to the second sub pixel SP2, and the third data line DL3 may connect to the third sub pixel SP3.

The first data line DL1 may comprise a 1-1 data line DL1*a* connecting to one of a pair of adjacent first sub pixels SP1 and a 1-2 data line DL1*b* connecting to the other of the pair of adjacent first sub pixels SP1. The second data line DL2 may comprise a 2-1 data line DL2*a* connecting to one of a pair of adjacent second sub pixels SP2 and a 2-2 data line DL2*b* connecting to the other of the pair of adjacent second sub pixels SP2. The third data line DL3 may comprise a 3-1 data line DL3*a* connecting to one of a pair of adjacent third sub pixels SP3 and a 3-2 data line DL3*b* connecting to the other of the pair of adjacent third sub pixels SP3.

Further, in the case where a micro LED is used as the light emitting diode 130, a plurality of micro LEDs are formed on a wafer, and transferred to the substrate of the display panel PN, to form a display device 100. However, in the process where the plurality of micro LEDs having a minute size is transferred from the wafer to the display panel PN, a failure in which the micro LEDs are not transferred may occur, or a failure in which the micro LEDs are transferred outside the right positions thereof due to an arrangement error may occur, causing a failure of the sub pixel SP. Accordingly, considering a failure in the transfer of the micro LEDs, a light emitting diode 130 emitting light of the same color is transferred to a pair of sub pixels SP, and a pair of light emitting diodes 130 is alternately driven to prepare for a failure of the sub pixels SP. For example, even if any one of the pair of sub pixels SP respectively comprising a light emitting diode 130 fails, the other sub pixel SP may be driven normally for at least a part of driving period and compensate a defective sub pixel SP so that the defective sub pixel SP may not be recognized.

One of the light emitting diodes 130 of a pair of sub pixels SP may be defined as a main light emitting diode 130, and the other light emitting diode 130 may be defined as a redundancy light emitting diode 130. The redundancy light emitting diode 130 may be a spare light emitting diode 130 that is additionally transferred to prepare for a failure of the main light emitting diode 130. Even if the main light emitting diode 130 is not transferred or is transferred outside the right position thereof due to an arrangement error, the redundancy light emitting diode 130 may emit light normally. Accordingly, the main and redundancy light emitting diodes 130 are disposed together, so that deterioration in display quality caused by a failure of the main light emitting diode 130 or the redundancy light emitting diode 130 may be reduced or minimized.

For example, referring to FIG. 2, one of the first light emitting diodes 130R of a pair of first sub pixels SP1 may be defined as a main first light emitting diode 130R, and the other may be defined as a redundancy first light emitting diode 130R. One of the second light emitting diodes 130G of a pair of second sub pixels SP2 may be defined as a main second light emitting diode 130G, and the other may be defined as a redundancy second light emitting diode 130G. One of the third light emitting diodes 130B of a pair of third sub pixels SP3 may be defined as a main third light emitting diode 130B, and the other may be defined as a redundancy third light emitting diode 130B.

In the display device 100 of one embodiment, a MUX circuit MUX may connect to a pair of data lines DL connecting to a pair of sub pixels SP emitting light of the same color, to drive a main light emitting diode 130 and a redundancy light emitting diode 130 of each of the pair of sub pixels SP alternately. Accordingly, since the MUX circuit MUX connects to the pair of data lines DL, the main light emitting diode 130 and the redundancy light emitting diode 130 may be driven alternately, and even if one of the main and redundancy light emitting diodes 130 fails, any one of the main light emitting diode 130 and the redundancy light emitting diode 130 may be driven normally for the other driving period.

The MUX circuit MUX connecting to the plurality of data lines DL is disposed in the display panel PN. The MUX circuit MUX may connect between one data pad DP and a pair of data lines DL. At this time, the data pad DP is a pad electrically connecting to the data driver DD and receiving a data voltage, and the data pad DP may be formed in the non-active area NA of the display panel PN. Additionally, the MUX circuit MUX may be formed in the non-active area NA together with the data pad DP. The MUX circuit MUX may selectively provide a data voltage supplied from one data pad DP to one of the pair of data lines DL. The MUX circuit MUX may electrically connect only one of the pair of data lines DL with the data pad DP.

For example, a pair of first data lines DL1 connecting to a pair of adjacent fist sub pixels SP1 may connect to the same MUX circuit MUX, a pair of second data lines DL2 connecting to a pair of adjacent second sub pixels SP2 may connect to the same MUX circuit MUX, and a pair of third data lines DL3 connecting to a pair of adjacent third sub pixels SP3 may connect to the same MUX circuit MUX. The 1-1 data line DL1*a* and the 1-2 data line DL1*b* may connect to the same MUX circuit MUX, the 2-1 data line DL2*a* and the 2-2 data line DL2*b* may connect to the same MUX circuit MUX, and the 3-1 data line DL3*a* and the 3-2 data line DL3*b* may connect to the same MUX circuit MUX.

The MUX circuit MUX may provide a data voltage to any one of the pair of first data lines DL1, and accordingly, any one of the pair of adjacent first sub pixels SP1 may be driven. The MUX circuit MUX may provide a data voltage to any one of the pair of second data lines DL2, and accordingly, any one of the pair of adjacent second sub pixels SP2 may be driven. The MUX circuit MUX may provide a data voltage to any one of the pair of third data lines DL3, and accordingly, any one of the pair of adjacent third sub pixels SP3 may be driven.

The pair of first sub pixels SP1 may be driven for a different period by the MUX circuit MUX. Similarly, the pair of second sub pixels SP2 may be driven for a different period, and the pair of third sub pixels SP3 may be driven for a different period. For example, the pair of first sub pixels SP1 may be driven alternately based on a frame unit, the pair of second sub pixels SP2 may be driven alternately based on a frame unit, and the pair of third sub pixels SP3 may be driven alternately based on a frame unit. Accordingly, the pair of sub pixels SP may be alternately driven by using the MUX circuit MUX.

Further, as described above, in the case where the first light emitting diodes 130R of the pair of first sub pixels SP1 are respectively defined as a main first light emitting diode 130R and a redundancy first light emitting diode 130R, the main first light emitting diode 130R may be driven in an $N^{th}$ frame, and the redundancy first light emitting diode 130R may be driven in an $N+1^{th}$ frame, by the MUX circuit MUX. That is, the main first light emitting diode 130R and the redundancy first light emitting diode 130R may be driven alternately based on the frame unit. If the main first light emitting diode 130R fails out of the main first light emitting diode 130R and the redundancy first light emitting diode 130R, recognition of a failure of the main first light emitting diode 130R in the Nth frame may be reduced or minimized by the redundancy first light emitting diode 130R that is driven normally in the $N+1^{th}$ frame. Similarly, since the second light emitting diodes 130G of the pair of second sub pixels SP2 and the third light emitting diodes 130B of the pair of third sub pixels SP3 are driven alternately based on the frame unit, even if the second sub pixel SP2 and the third sub pixel SP3 fail, the failure may be compensated so that the failure is not recognized.

The MUX circuit MUX may comprise a plurality of transistors, to provide a data voltage only to one of the pair of data lines DL, and detailed description of the MUX circuit MUX is provided hereinafter with reference to FIGS. 5 and 6.

Additionally, the pixel circuit PC of the sub pixel SP may be comprised of various types of circuits comprising a plurality of transistors and capacitors. Hereinafter, an exemplary circuit of a pixel circuit PC of one embodiment is described with reference to FIGS. 3 and 4.

Figure 3:
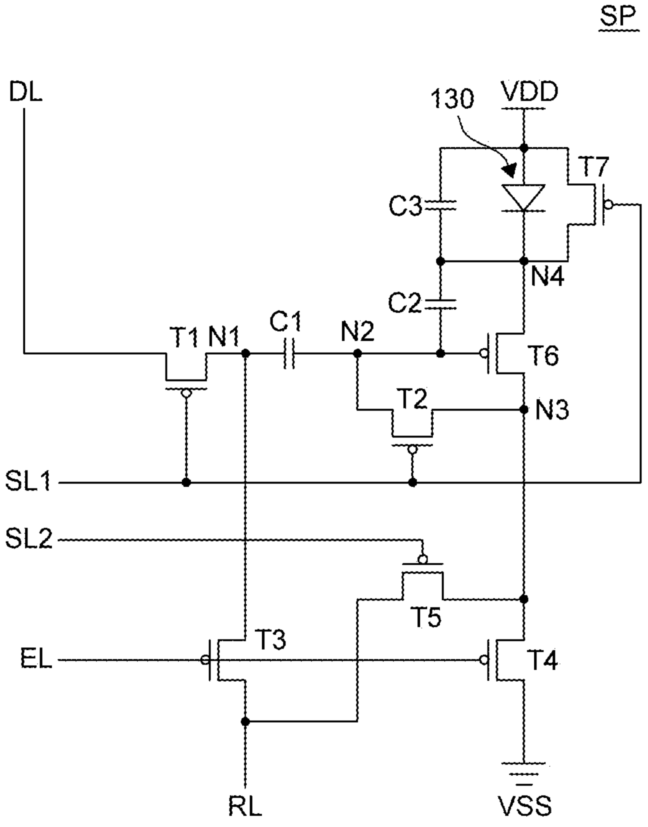
FIG. 3 is an exemplary circuit diagram of the sub pixel of the display device of one embodiment.

Referring to FIG. 3, each of the plurality of sub pixels SP comprises a pixel circuit PC and a light emitting diode 130 connecting the pixel circuit. For example, an exemplary pixel circuit PC of each of the plurality of sub pixels SP may comprise a first transistor T1, a second transistor T2, a third transistor T3, a fourth transistor T4, a fifth transistor T5, a sixth transistor T6, a seventh transistor T7, a first capacitor C1, a second capacitor C2 and a third capacitor C3.

Each of the first transistor T1, the second transistor T2, the third transistor T3, the fourth transistor T4, the fifth transistor T5, the sixth transistor T6 and the seventh transistor T7 of the pixel circuit PC comprises a gate electrode, a source electrode and a drain electrode.

The first transistor T1, the second transistor T2, the third transistor T3, the fourth transistor T4, the fifth transistor T5, the sixth transistor T6 and the seventh transistor T7 may be a N-type transistor or a P-type transistor. In the case of a N-type transistor, since an electron is a carrier, the electron may flow from a source electrode to a drain electrode, and current may flow from a drain electrode to a source electrode. In the case of a P-type transistor, since a hole is a carrier, the hole may flow from a source electrode to a drain electrode, and current may flow from a source electrode to a drain electrode. For example, one of the plurality of transistors may be an N-type transistor, while the other of the plurality of transistors may be a P-type transistor.

Hereinafter, suppose that the first transistor T1, the second transistor T2, the third transistor T3, the fourth transistor T4, the fifth transistor T5, the sixth transistor T6 and the seventh transistor T7 are P-type transistors, but the transistors are not limited thereto.

The first transistor T1 comprises a first gate electrode, a first source electrode and a first drain electrode. The first gate electrode connects to a first scan line SL1, the first source electrode connects to the data line DL, and the first drain electrode connects to a first node N1. The first transistor T1 may supply a data voltage from the data line DL to the first node N1 based on a scan signal of the first scan line SL1. Accordingly, the first transistor T1 configured to supply a data voltage to the sub pixel SP may also be referred to as a switching transistor.

At this time, a first transistor T1 of the first sub pixel SP1 may connect to the first data line DL1, a first transistor T1 of the second sub pixel SP2 may connect to the second data line DL2, and a first transistor T1 of the third sub pixel SP3 may connect to the third data line DL3.

The second transistor T2 comprises a second gate electrode, a second source electrode and a second drain electrode. The second gate electrode connects to the first scan line SL1, the second source electrode connects to a second node N2, and the second drain electrode connects to a third node N3. The second transistor T2 may short-circuit a sixth gate electrode and a sixth drain electrode of the sixth transistor T6 and diode-connect the sixth transistor T6. The diode connection denotes short-circuiting a gate electrode from a source electrode or a drain electrode, and operating a transistor like a diode. At this time, the second transistor T2 may be embodied as an oxide semiconductor transistor of low off current and reduce or minimize the leakage of current from the sixth gate electrode of the sixth transistor T6.

The third transistor T3 comprises a third gate electrode, a third source electrode and a third drain electrode. The third gate electrode connects to the light emission control signal line EL, the third source electrode connects to the reference line RL, and the third drain electrode connects to the first node N1. The third transistor T3 may supply a reference voltage from the reference line RL to the first node N1 based on a light emission control signal of the light emission control signal line EL.

The fourth transistor T4 comprises a fourth gate electrode, a fourth source electrode, and a fourth drain electrode. The fourth gate electrode connects to the light emission control signal line EL, the fourth source electrode connects to the third node N3, and the fourth drain electrode connects to the low potential power line VSS. The fourth transistor T4 may connect the third node N3 and the low potential power line VSS electrically and allow driving current to flow from the high potential power line VDD to the low potential power line VSS, based on a light emission control signal EL.

The fifth transistor T5 comprises a fifth gate electrode, a fifth source electrode and a fifth drain electrode. The fifth gate electrode connects to a second scan line SL2, the fifth source electrode connects to the reference line RL, and the fifth drain electrode connects to the third node N3. The fifth transistor T5 may provide a reference voltage to the third node N3 based on a scan signal of the second scan line SL2, and reset the third node N3, i.e., the sixth drain electrode of the sixth transistor T6 to a reference voltage.

The sixth transistor T6 comprises a sixth gate electrode, a sixth source electrode and a sixth drain electrode. The sixth gate electrode connects to the second node N2, the sixth source electrode connects to a fourth node N4, and the sixth drain electrode connects to the third node N3. The sixth transistor T6 may be turned on to control driving current flowing in the light emitting diode 130. Accordingly, the sixth transistor T6 controlling driving current to be provided to the light emitting diode 130 may be defined as a driving transistor.

The seventh transistor T7 comprises a seventh gate electrode, a seventh source electrode, and a seventh drain electrode. The seventh gate electrode connects to the first scan line SL1, the seventh source electrode connects to the high potential power line VDD, and the seventh drain electrode connects to the fourth node N4. The seventh transistor T7 may supply a high potential power voltage to the fourth node N4 based on a scan signal of the first scan line SL1 and prevent the light emitting diode 130 from emitting light during charge of data voltage.

The first capacitor C1 comprises a capacitor electrode connecting to the first node N1, and a capacitor electrode connecting to the second node N2. The first capacitor C1 may adjust the voltage of the second node N2 by using coupling properties, and fix a voltage supplied to the six gate electrode of the sixth transistor T6 while the light emitting diode 130 emits light and keep driving current constant.

The second capacitor C2 comprises a capacitor electrode connecting to the second node N2 and a capacitor electrode connecting to the fourth node N4. In other words, the second capacitor C2 connects between the sixth gate electrode of the sixth transistor T6 and the sixth source electrode thereof, i.e., between the sixth gate electrode and the first electrode of the light emitting diode 130.

Additionally, in the case where a voltage changes at the first node N1, voltage of the second node N2 may change. At this time, the second capacitor C2 connecting in series with the first capacitor C1 may be coupled to the first capacitor C1, and depending on a capacity ratio of the first capacitor C1 to the second capacitor C2, voltage of the first node N1 may be delivered to voltage of the second node N2. Accordingly, a rate of delivery of data voltage from the first node N1 to the second node N2 may decrease with the second capacitor C2. Further, in the case where the light emitting diode 130 is comprised of a micro LED of a large I-V curve gradient, the second capacitor C2 may be used to decrease a delivery rate of data voltage to display finer gradation.

The third capacitor C3 comprises a capacitor electrode connecting to the fourth node N4, and a capacitor electrode connecting to the high potential power line VDD. That is, the third capacitor C3 comprises a capacitor electrode connecting respectively to the first electrode and the second electrode of the light emitting diode 130. The third capacitor C3 may increase capacitance inherent in the light emitting diode 130 so that light of higher luminance may emit from the light emitting diode 130.

The light emitting diode 130 comprises the first electrode connecting to the high potential power line VDD and the second electrode connecting to the fourth node N4. The light emitting diode 130 may connect between the high potential power line VDD and the sixth transistor T6.

Figure 4:
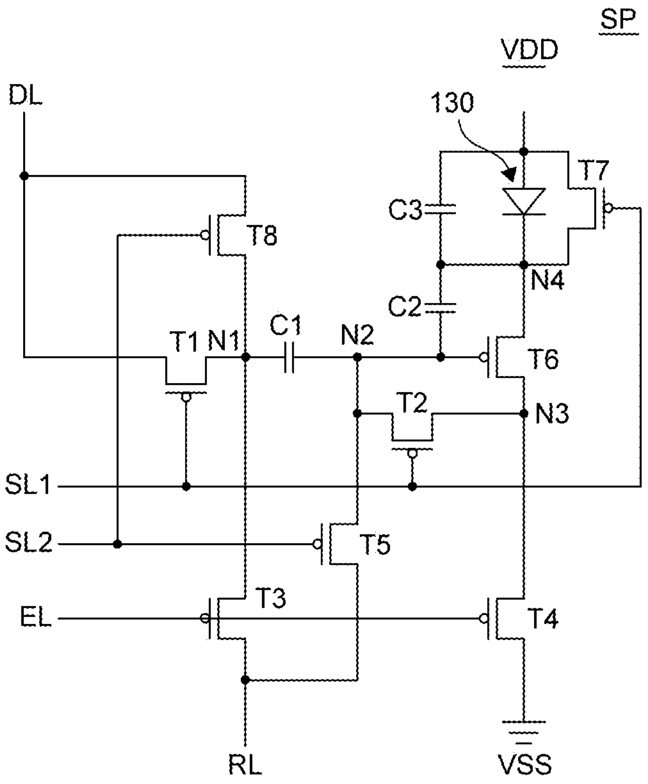
FIG. 4 is another exemplary circuit diagram of the sub pixel of the display device of one embodiment.

Referring to FIG. 4, another exemplary pixel circuit PC of each of the plurality of sub pixels SP may further comprise an eighth transistor T8, and may be the same as the exemplary pixel circuit PC in FIG. 3, except for a connection structure of the fifth transistor T5. For example, another exemplary pixel circuit PC may comprise a first transistor T1, a second transistor T2, a third transistor T3, a fourth transistor T4, a fifth transistor T5, a sixth transistor T6, a seventh transistor T7, an eighth transistor T8, a first capacitor C1, a second capacitor C2 and a third capacitor C3.

The eighth transistor T8 comprises an eighth gate electrode, an eighth source electrode and an eighth drain electrode. The eighth gate electrode connects to the second scan line SL2, the eighth source electrode connects to the data line DL, and the eighth drain electrode connects to the first node N1. The eighth transistor T8 may supply a data voltage to the first node N1 based on a scan signal of the second scan line SL2. The eighth transistor T8 is configured to charge the first capacitor C1 partially with a data voltage while initializing voltage of the sixth gate electrode of the sixth transistor T6 that is a driving transistor. While the eighth transistor T8 is used to charge the first capacitor C1 with a data voltage partially, a change in the voltage of the sixth gate electrode may be reduced or minimized.

The fifth drain electrode of the fifth transistor T5 connects to the second node N2. The fifth transistor T5 may supply a reference voltage to the second node N2 based on a scan signal of the second scan line SL2.

Accordingly, the pixel circuit PC may comprise a plurality of transistors and a plurality of capacitors to provide driving current to the light emitting diode 130. However, the pixel circuit PC may be comprised of another circuit instead of the exemplary circuit of FIGS. 3 and 4, and not limited thereto.

Hereinafter, the circuit of the MUX circuit MUX of the display device 100 of one embodiment is specifically described with reference to FIGS. 5 and 6.

Figure 5:
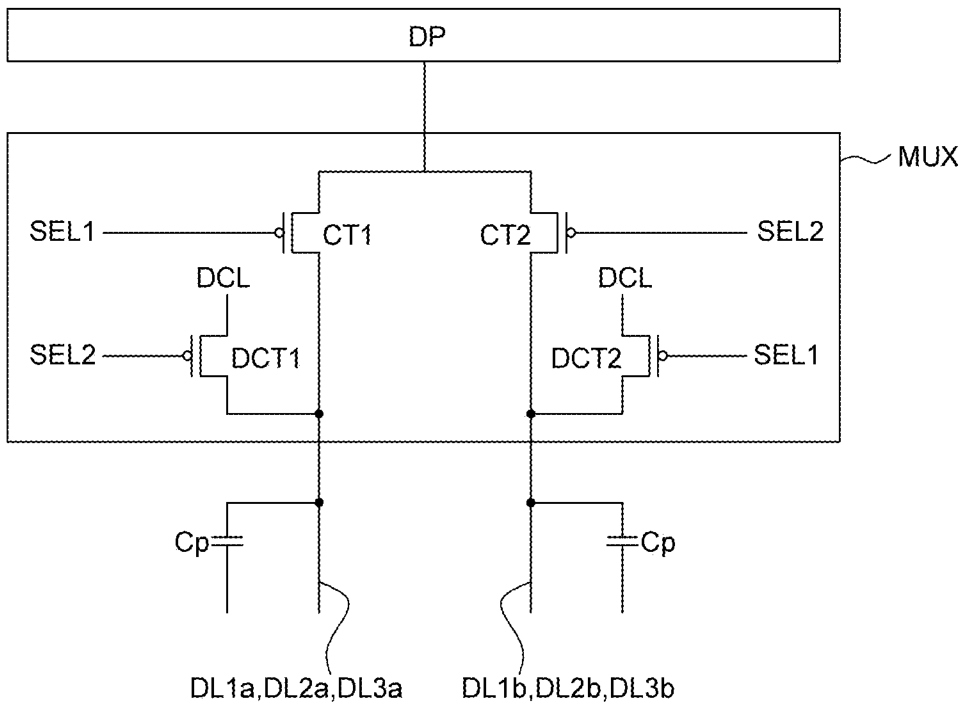
FIG. 5 is a circuit diagram of the MUX circuit of the display device of one embodiment.

FIG. 5 is a circuit diagram of the MUX circuit of the display device of one embodiment. FIG. 6 is a driving timing diagram of the MUX circuit of the display device of one embodiment.

Figure 6:
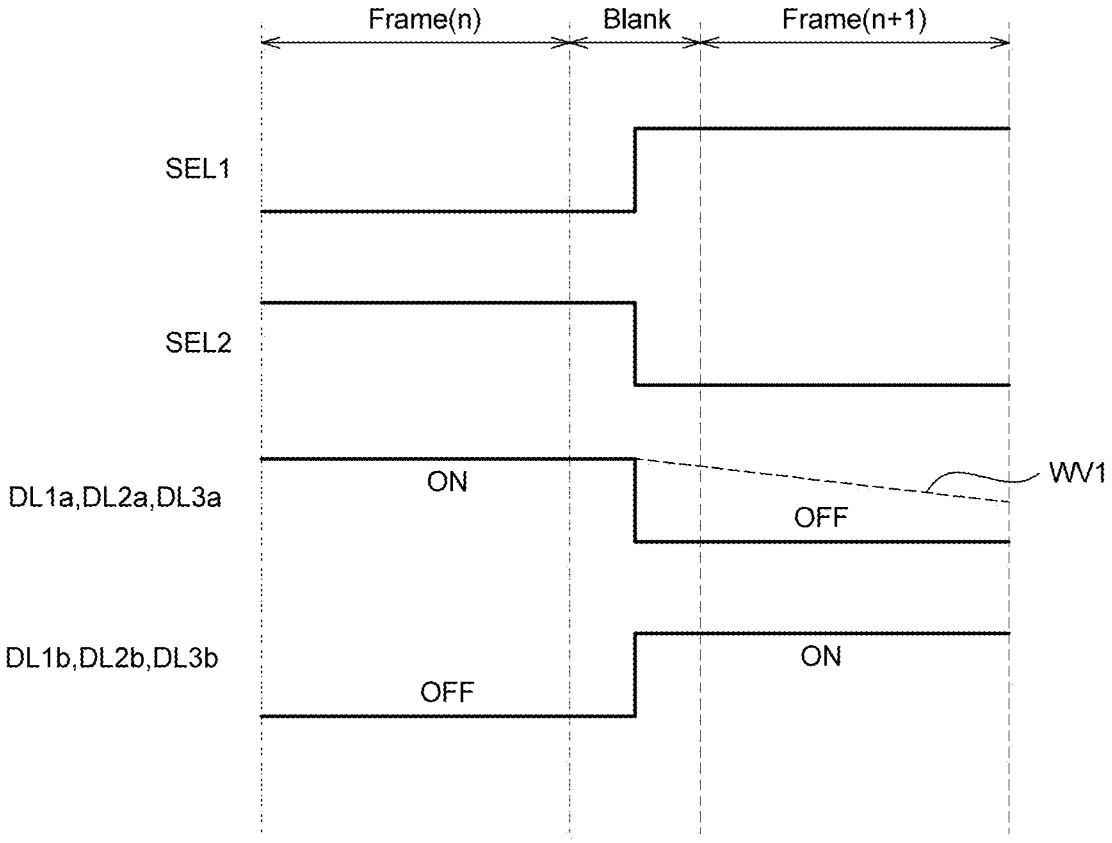
FIG. 6 is a driving timing diagram of the MUX circuit of the display device of one embodiment.

Referring to FIGS. 5 and 6, the MUX circuit MUX connecting to the pair of data lines DL comprises a first charge transistor CT1, a second charge transistor CT2, a first discharge transistor DCT1 and a second discharge transistor DCT2.

The first charge transistor CT1 and the second charge transistor CT2 are transistors for delivering a data voltage to the data lines DL. The first charge transistor CT1 and the second charge transistor CT2 may supply a data voltage to the data lines DL, to charge the data lines DL with the data voltage. Any one of the pair of data lines DL may be connected to the data pad DP by the first charge transistor CT1, and the other of the pair of data lines DL may be connected to the data pad DP by the second charge transistor CT2.

Additionally, the first charge transistor CT1 and the second charge transistor CT2 may electrically connect any one of the pair of data lines DL with the data pad DP for a different period. While the first charge transistor CT1 connects the data pad DP with one data line DL, the second charge transistor CT2 may be turned off not to connect the data pad DP with the other data line DL electrically. On the contrary, while the second charge transistor CT2 connects the data pad DP with the other data line DL, the first charge transistor CT1 may be turned off not to connect the data pad DP and one data line DL electrically.

The first charge transistor CT1 may connect to one of the pair of data lines DL, and the second charge transistor CT2 may connect to the other data line DL. For example, the first charge transistor CT1 may connect to the 1-1 data line DL1*a*, the 2-1 data line DL2*a*, and the 3-1 data line DL3*a*, and the second charge transistor CT2 may connect to the 1-2 data line DL1*b*, the 2-2 data line DL2*b* and the 3-2 data line DL3*b*. Additionally, the first charge transistor CT1 may be turned on or turned off by a first selection signal of a first selection line SEL1, and the second charge transistor CT2 may be turned on or turned off by a second selection signal of a second selection line SEL2.

For example, in a MUX circuit MUX connecting to the pair of first data lines DL1, a source electrode and a drain electrode of the first charge transistor CT1 may respectively connect to each of the data pad DP and the 1-1 data line DL1*a*, while a gate electrode may connect to the first selection line SEL1. In the MUX circuit MUX connecting to the pair of first data lines DL1, a source electrode and a drain electrode of the second charge transistor CT2 may respectively connect to each of the data pad DP and the 1-2 data line DL1*b*, while a gate electrode may connect to the second selection line SEL2.

For example, in a MUX circuit MUX connecting to the pair of second data lines DL2, a source electrode and a drain electrode of the first charge transistor CT1 may respectively connect to each of the data pad DP and the 2-1 data line DL2*a*, while a gate electrode may connect to the first selection line SEL1. In the MUX circuit MUX connecting to the pair of second data lines DL2, a source electrode and a drain electrode of the second charge transistor CT2 may respectively connect to each of the data pad DP and the 2-2 data line DL2*b*, while a gate electrode may connect to the second selection line SEL2.

For example, in a MUX circuit MUX connecting to the pair of third data lines DL3, a source electrode and a drain electrode of the first charge transistor CT1 may respectively connect to each of the data pad DP and the 3-1 data line DL3*a*, while a gate electrode may connect to the first selection line SEL1. In the MUX circuit MUX connecting to the pair of third data lines DL3, a source electrode and a drain electrode of the second charge transistor CT2 may respectively connect to each of the data pad DP and the 3-2 data line DL3*b*, while a gate electrode may connect to the second selection line SEL2.

Additionally, the plurality of data lines DL may be disposed across the active area AA, and disposed to overlap a variety of elements disposed in the active area AA or to be adjacent to a variety of elements disposed in the active area AA. For example, the data lines DL may be disposed to overlap a variety of lines such as the scan lines SL, the light emission control signal lines EL and the like, or to be adjacent to a variety of lines such as the scan lines SL, the light emission control signal lines EL and the like. Accordingly, while the data lines DL overlap other elements in the active area AA, a parasitic capacitor Cp may be formed between the data line DL and another element. At this time, the data voltage charged in the data lines DL may not be normally discharged by parasitic capacitance of the parasitic capacitor Cp. If the data voltage of a data line DL is not discharged normally, a failure in which a sub pixel SP connecting to the data line DL emits light abnormally for a non-emission period may occur. To prevent this from happening, in the display device 100 of one embodiment, a discharge transistor and a discharge line DCL may connect to each of the plurality of data lines DL, to discharge the data voltage charged in the plurality of data lines DL and prevent a failure in which a part of the sub pixels SP emit light for a period outside of the period for which the sub pixels SP are driven.

Specifically, the first discharge transistor DCT1 and the second discharge transistor DCT2 are transistors for discharging the voltage charged in the data line DL. Each of the first discharge transistor DCT1 and the second discharge transistor DCT2 may connect the data line DL with the discharge line DCL and discharge the voltage charged in the data line DL. Any one of the pair of data lines DL may be connected to the discharge line DCL by the first discharge transistor DCT1, and the other of the pair of data lines DL may be connected to the discharge line DCL by the second discharge transistor DCT2.

The first discharge transistor DCT1 may connect to one of the pair of data lines DL, and the second discharge transistor DCT2 may connect to the other of the pair of data lines DL. For example, the first discharge transistor DCT1 may connect to the 1-1 data line DL1*a*, the 2-1 data line DL2*a*, and the 3-1 data line DL3*a*, and the second discharge transistor DCT2 may connect to the 1-2 data line DL1*b*, the 2-2 data line DL2*b*, and the 3-2 data line DL3*b*. Additionally, the first discharge transistor DCT1 may be turned on or turned off by a second selection signal of the second selection line SEL2, and the second discharge transistor DCT2 may be turned on or turned off by a first selection signal of the first selection line SEL1.

Further, the first discharge transistor DCT1 and the second discharge transistor DCT2 may connect any one of the pair of data lines DL with the discharge line DCL for a different period. While the first discharge transistor DCT1 connects the discharge line DCL with one data line DL, the second discharge transistor DCT2 may be turned off not to connect the discharge line DCL with the other data line DL. While the second discharge transistor DCT2 connects the discharge line DCL with the other data line DL, the first discharge transistor DCT1 may be turned off not to connect the discharge line DCL with one data line DL. For example, the discharge line DCL may be a line such as a low potential power line VSS or a reference line RL and the like, to which a constant voltage is supplied, but not limited thereto.

For example, in a MUX circuit MUX connecting to the pair of first data lines DL1, a source electrode and a drain electrode of the first discharge transistor DCT1 may respectively connect to each of the 1-1 data line DL1*a* and the discharge line DCL, while a gate electrode may connect to the second selection line SEL2. In the MUX circuit MUX connecting to the pair of first data lines DL1, a source electrode and a drain electrode of the second discharge transistor DCT2 may respectively connect to each of the 1-2 data line DL1*b* and the discharge line DCL, while a gate electrode may connect to the first selection line SEL1.

For example, in a MUX circuit MUX connecting to the pair of second data lines DL2, a source electrode and a drain electrode of the first discharge transistor DCT1 may respectively connect to each of the 2-1 data line DL2*a* and the discharge line DCL, while a gate electrode may connect to the second selection line SEL2. In the MUX circuit MUX connecting to the pair of second data lines DL2, a source electrode and a drain electrode of the second discharge transistor DCT2 may respectively connect to each of the 2-2 data line DL2*b* and the discharge line DCL, while a gate electrode may connect to the first selection line SEL1.

For example, in a MUX circuit MUX connecting to the pair of third data lines DL3, a source electrode and a drain electrode of the first discharge transistor DCT1 may respectively connect to each of the 3-1 data line DL3*a* and the discharge line DCL, while a gate electrode may connect to the second selection line SEL2. In the MUX circuit MUX connecting to the pair of third data lines DL3, a source electrode and a drain electrode of the second discharge transistor DCT2 may respectively connect to each of the 3-2 data line DL3*b* and the discharge line DCL, while a gate electrode may connect to the first selection line SEL1.

Referring to FIG. 6, in a $n^{th}$ frame Frame(n), a first selection signal of a turn-on level may be output from the first selection line SEL1, and a second selection signal of a turn-off level may be output from the second selection line SEL2. For example, in the case where the plurality of charge transistors and the plurality of discharge transistors are P-type transistors, a first selection signal of a low level may be supplied as a signal of a turn-on level, and a second selection signal of a high level may be supplied as a signal of a turn-off level.

The first charge transistor CT1 may be turned on, and the second charge transistor CT2 may be turned off, by the first selection signal of a turn-on level and the second selection signal of a turn-off level. Each of the 1-1 data line DL1*a*, the 2-1 data line DL2*a* and the 3-1 data line DL3*a* may be electrically connected to the data pad DP by the turned-on first charge transistor CT1. On the contrary, each of the 1-2 data line DL1*b*, the 2-2 data line DL2*b* and the 3-2 data line DL3*b* may be separated from the data pad DP by the turned-off second charge transistor CT2. Accordingly, the plurality of MUX circuits MUX may supply a data voltage from the data pad DP only to the 1-1 data line DL1*a*, the 2-1 data line DL2*a* and the 3-1 data line DL3*a*, among the plurality of data lines DL, for the $n^{th}$ frame Frame(n) period.

For the $n^{th}$ frame Frame(n) period, the second discharge transistor DCT2 may be turned on, and the first discharge transistor DCT1 may be turned off, by the first selection signal of a turn-on level and the second selection signal of a turn-off level. Each of the 1-2 data line DL1*b*, the 2-2 data line DL2*b* and the 3-2 data line DL3*b* may be connected to the discharge line DCL by the turned-on second discharge transistor DCT2. The voltage charged in each of the 1-2 data line DL1*b*, the 2-2 data line DL2*b* and the 3-2 data line DL3*b* may be discharged to the discharge line DCL through the second discharge transistor DCT2. Each of the 1-1 data line DL1*a*, the 2-1 data line DL2*a* and the 3-1 data line DL3*a* may be separated from the discharge line DCL by the turned-off first discharge transistor DCT1. Accordingly, the data voltage charged in each of the 1-1 data line DL1*a*, the 2-1 data line DL2*a* and the 3-1 data line DL3*a* may be prevented from being discharged.

Thus, for the $n^{th}$ frame Frame(n) period, the first charge transistor CT1 may be turned on to supply a data voltage from the data pad DP to a plurality of sub pixels SP connecting respectively to the 1-1 data line DL1*a*, the 2-1 data line DL2*a* and the 3-1 data line DL3*a*. Additionally, for the $n^{th}$ frame Frame(n) period, the second discharge transistor DCT2 may be turned on to discharge the voltage charged in the 1-2 data line DL1*b*, the 2-2 data line DL2*b* and the 3-2 data line DL3*b* and to control sub pixels SP connecting to the 1-2 data line DL1*b*, the 2-2 data line DL2*b* and the 3-2 data line DL3*b* thereby preventing the sub pixels SP from emitting light.

Then a first selection signal of a turn-off level may be output from the first selection line SEL1, and a second selection signal of a turn-on level may be output from the second selection line SEL2, for a period from a blank period, which is between the $n^{th}$ frame Frame(n) and the $n+1^{th}$ frame Frame(n+1), to the $n+1^{th}$ frame Frame(n+1) period. For example, in the case where the plurality of charge transistors and the plurality of discharge transistors are P-type transistors, a first selection signal of a high level may be supplied as a turn-off level signal, and a second selection signal of a low level may be supplied as a turn-on level signal.

The first charge transistor CT1 may be turned off, and the second charge transistor CT2 may be turned on, by a first selection signal of a turn-off level and a second selection signal of a turn-on level. Each of the 1-2 data line DL1*b*, the 2-2 data line DL2*b* and the 3-2 data line DL3*b* may be connected electrically to the data pad DP by the turned-on second charge transistor CT2. On the contrary, each of the 1-1 data line DL1*a*, the 2-1 data line DL2*a* and the 3-1 data line DL3*a* may be separated from the data pad DP by the turned-off first charge transistor CT1. Accordingly, for the $n+1^{th}$ frame Frame(n+1) period, the plurality of MUX circuits MUX may supply a data voltage from the data pad DP only to the 1-2 data line DL1*b*, the 2-2 data line DL2*b* and the 3-2 data line DL3*b* among the plurality of data lines DL.

For the $n+1^{th}$ frame Frame(n+1) period, the second discharge transistor DCT2 may be turned off, and the first discharge transistor DCT1 may be turned on by a first selection signal of a turn-off level and a second selection signal of a turn-on level. Each of the 1-1 data line DL1*a*, the 2-1 data line DL2*a* and the 3-1 data line DL3*a* may be connected to the discharge line DCL by the turned-on first discharge transistor DCT1. The voltage charged in each of the 1-1 data line DL1*a*, the 2-1 data line DL2*a* and the 3-1 data line DL3*a* may be discharged to the discharge line DCL through the first discharge transistor DCT1. Each of the 1-2 data line DL1*b*, the 2-2 data line DL2*b* and the 3-2 data line DL3*b* may be separated from the discharge line DCL by the turned-off second discharge transistor DCT2. Accordingly, the data voltage charged in each of the 1-2 data line DL1*b*, the 2-2 data line DL2*b* and the 3-2 data line DL3*b* may be prevented from being discharged.

Thus, for the $n+1^{th}$ frame Frame(n+1) period, the second charge transistor CT2 may be turned on to supply a data voltage from the data pad DP to a plurality of sub pixels SP that connects to each of the 1-2 data line DL1*b*, the 2-2 data line DL2*b* and the 3-2 data line DL3*b*. Additionally, for the $n+1^{th}$ frame Frame(n+1) period, the first discharge transistor DCT1 may be turned on to discharge the voltage charged in the 1-1 data line DL1*a*, the 2-1 data line DL2*a* and the 3-1 data line DL3*a*, and control sub pixels SP connecting to the 1-1 data line DL1*a*, the 2-1 data line DL2*a* and the 3-1 data line DL3*a* to prevent the sub pixels SP from emitting light.

Further, a first selection signal of the first selection line SEL1 and a second selection signal of the second selection line SEL2 may be signals that are mutually reversed. In the case where the phase of the first selection signal is reversed, the first selection signal may become a signal the same as the second selection signal. The first selection signal and the second selection signal may be signals of a mutually reversed phase. Accordingly, the first selection signal and the second selection signal may not be output as a turn-on level signal or a turn-off level signal at the same time.

Additionally, each of the first charge transistor CT1 and the first discharge transistor DCT1 connecting to the same data line DL may be controlled by a different selection line, and each of the second charge transistor CT2 and the second discharge transistor DCT2 connecting to the same data line DL may be controlled by a different selection line. Accordingly, the first charge transistor CT1 and the first discharge transistor DCT1 connecting to the same data line DL may be turned on for a different period, and the second charge transistor CT2 and the second discharge transistor DCT2 connecting to the same data line DL may be turned on for a different period.

Thus, in the display device 100 of one embodiment, a discharge transistor is formed in the MUX circuit MUX so that a failure where a part of the sub pixels SP emit light abnormally may be prevented. If the MUX circuit MUX comprises a charge transistor only without comprising a discharge transistor, the voltage of the data line DL connecting to sub pixels SP in a non-emission state is not discharged normally, causing a failure in which a part of sub pixels SP emit light, as described above. For example, for the $n+1^{th}$ frame Frame(n+1) period where the first sub pixel SP1 connecting to the 1-2 data line DL1*b* only emits light, a failure in which the first sub pixel SP1 connecting to the 1-1 data line DL1*a* emits light together may occur, since the voltage of the 1-1 data line DL1*a* is not normally discharged as shown in a dotted wave form WV1 of FIG. 6. To prevent this from happening, the MUX circuit MUX of the display device 100 of one embodiment comprises a discharge transistor selectively connecting a voltage of the data line DL with the discharge line DCL, to prevent a failure in which a part of sub pixels SP emit light for a non-emission period.

Further, in the display device 100 of one embodiment, one of the pair of sub pixels SP emitting light of the same color is only selected and driven, to increase driving current that is supplied to the light emitting diode 130 of each sub pixel SP. At this time, driving current is supplied sufficiently to the light emitting diode 130 even in a low gradation image, so that a failure of non-emission of the light emitting diode 130 may be reduced or minimized. For example, when driving current of 1A needs to be supplied to the light emitting diode 130 to display a specific low gradation image, driving current of 1A is supplied to the light emitting diode 130 of one of the pair of sub pixels SP to display a specific low gradation image, in the display device 100 of one embodiment. On the contrary, when a pair of sub pixels SP is all driven at the same time to display a specific low gradation image, driving current of 0.5 A is supplied to the light emitting diode 130 of each sub pixel SP to display a specific low gradation image. Accordingly, in the case where a pair of sub pixels SP is all driven at the same time to display an image, driving current supplied to the light emitting diode 130 of the sub pixel SP may decrease, and in the case of an image of lower gradation, a driving current value may decrease, causing a failure in which a part of light emitting diodes 130 do not emit light normally. To prevent this from happening, one of the pair of sub pixels SP emitting light of the same color is only selected and driven in the display device 100 of one embodiment, so that relatively large driving current may be supplied to the light emitting diode 130 of each sub pixel SP while the display quality of a low gradation image may improve.

Hereinafter, a detailed structure of the MUX circuit MUX of the display device 100 of one embodiment is described with reference to FIGS. 7 and 8.

Figure 7:
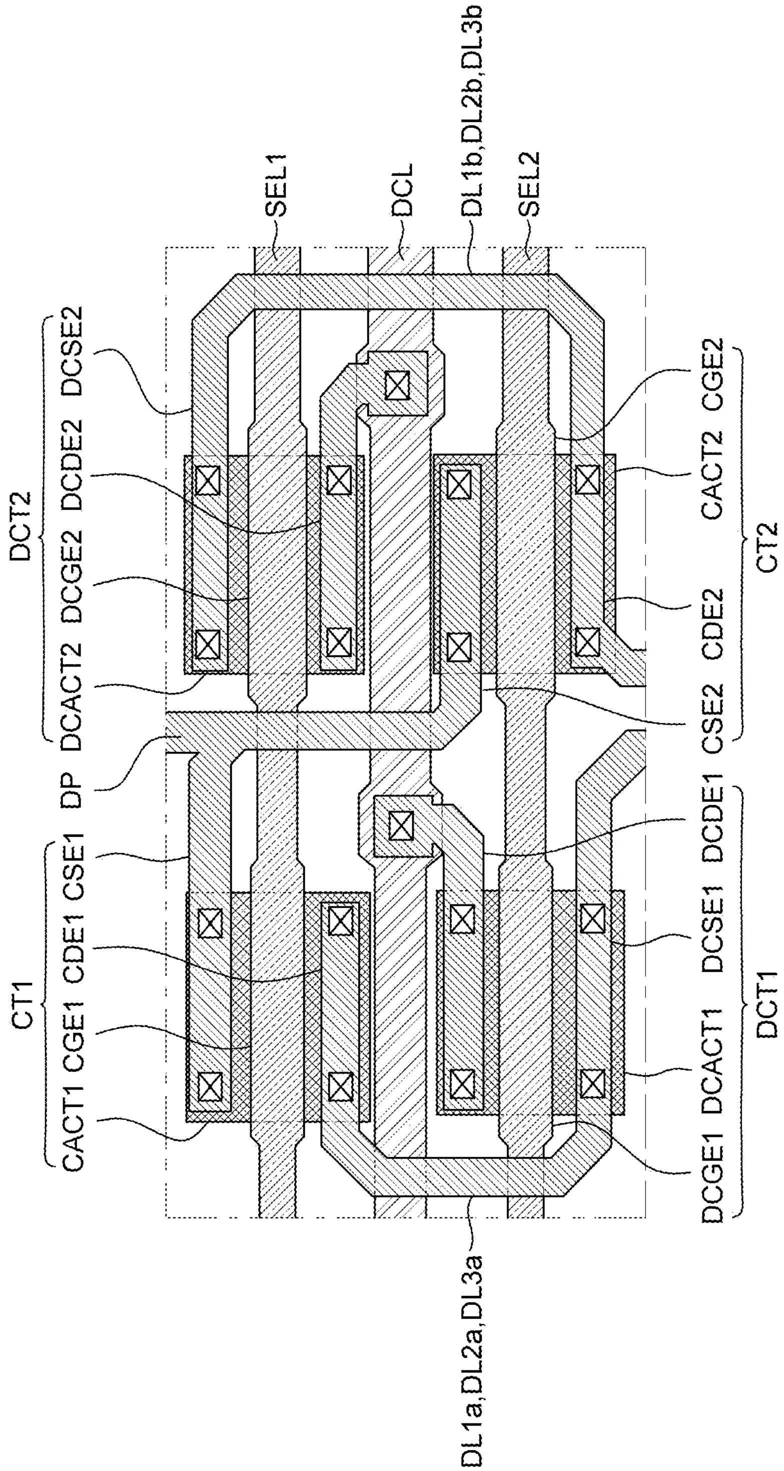
FIG. 7 is a plan view of the MUX circuit of the display device of one embodiment.

FIG. 7 is a plan view of the MUX circuit MUX of the display device of one embodiment. FIG. 8 is a cross-sectional view of the MUX circuit MUX of the display device of one embodiment.

Figure 8:
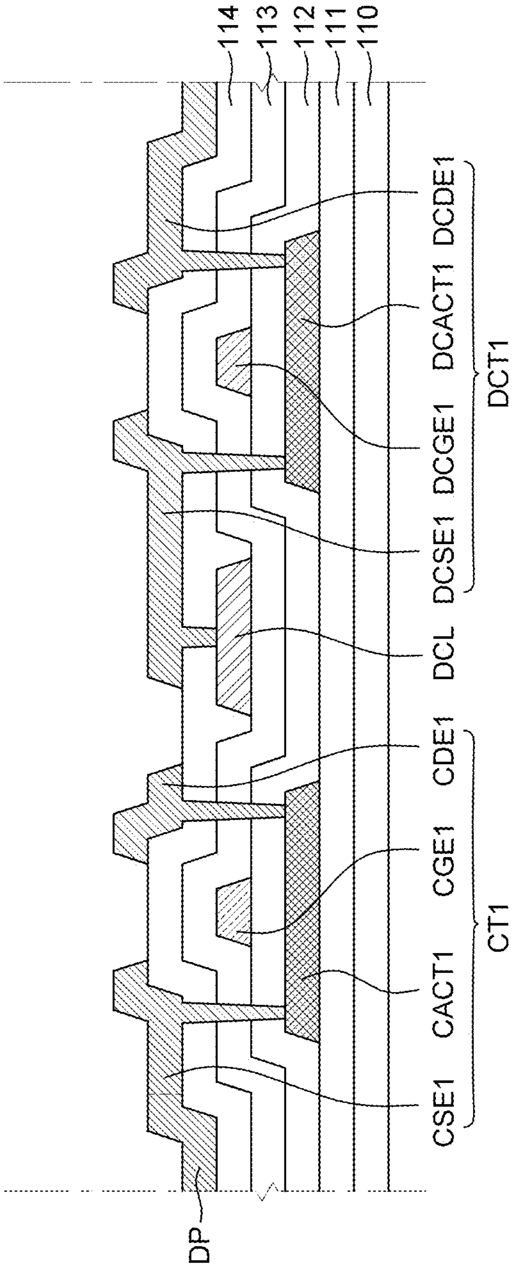
FIG. 8 is a cross-sectional view of the MUX circuit of the display device of one embodiment.

Referring to FIGS. 7 and 8, the display panel PN of the display device 100 of one embodiment comprises a substrate 110. The substrate 110 as a substrate supporting elements disposed on the display device 100 may be an insulation substrate 110. A plurality of sub pixels SP are formed on the substrate 110 to display an image. For example, the substrate 110 may be made of glass or resin and the like. Additionally, the substrate 110 may comprise polymer or plastics. In some embodiments, the substrate 110 may be made of a plastic material having flexibility.

A buffer layer 111 is disposed on the substrate 110. The buffer layer 111 may reduce the infiltration of moisture or impurities through the substrate 110. The buffer layer 111, for example, may be comprised of a single layer of silicon oxide (SiOx) or silicon nitride (SiNx) or multiple layers of silicon oxide (SiOx) or silicon nitride (SiNx), but not limited thereto. However, the buffer layer 111 may be omitted depending on the sort of substrate 110 or the sort of thin film transistor, and not limited thereto.

The MUX circuit MUX comprising the first charge transistor CT1, the second charge transistor CT2, the first discharge transistor DCT1 and the second discharge transistor DCT2 may be disposed on the buffer layer 111. The first charge transistor CT1 and the first discharge transistor DCT1 may be disposed to be adjacent to each other in a column direction, and the second charge transistor CT2 and the second discharge transistor DCT2 may be disposed to be adjacent to each other in the column direction. The first charge transistor CT1 and the second discharge transistor DCT2 may be disposed to be adjacent to each other in a row direction, and the second charge transistor CT2 and the first discharge transistor DCT1 may be disposed to be adjacent to each other in the row direction.

First, the first charge transistor CT1 comprising a first charge active layer CACT1, a first charge gate electrode CGE1, a first charge source electrode CSE1 and a first charge drain electrode CDE1 is disposed on the buffer layer 111.

The first charge active layer CACT1 is disposed on the buffer layer 111. The first charge active layer CACT1 may be made of a semiconductor material such as oxide semiconductor, amorphous silicon or polysilicon and the like, but not limited thereto.

A gate insulation layer 112 is disposed on the first charge active layer CACT1. The gate insulation layer 112 as an insulation layer insulating the first charge active layer CACT1 from the first charge gate electrode CGE1 electrically may be comprised of a single layer of silicon oxide (SiOx) or silicon nitride (SiNx) or multiple layers of silicon oxide (SiOx) or silicon nitride (SiNx), but not limited thereto.

The first charge gate electrode CGE1 is disposed on the gate insulation layer 112. The first charge gate electrode CGE1 may connect to the first selection line SEL1 electrically. The first charge gate electrode CGE1 may be made of an electrically conductive material, such as copper (Cu), aluminum (Al), molybdenum (Mo), nickel (Ni), titanium (Ti), chromium (Cr) or an alloy thereof, but not limited thereto.

A first interlayer insulation layer 113 and a second interlayer insulation layer 114 are disposed on the first charge gate electrode CGE1. The first interlayer insulation layer 113 and the second interlayer insulation layer 114 as an insulation layer for protecting elements thereunder may be made of a single layer of silicon oxide (SiOx) or silicon nitride (SiNx) or multiple layers of silicon oxide (SiOx) or silicon nitride (SiNx), but not limited thereto.

The first charge source electrode CSE1 and the first charge drain electrode CDE1 are disposed on the second interlayer insulation layer 114. The first charge source electrode CSE1 may electrically connect to the data pad DP, and the first charge drain electrode CDE1 may electrically connect to the 1-1 data line DL1*a*, the 2-1 data line DL2*a* and the 3-1 data line DL3*a*. Additionally, the first charge source electrode CSE1 and the first charge drain electrode CDE1 may electrically connect to the first charge active layer CACT1 through contact holes of the second interlayer insulation layer 114, the first interlayer insulation layer 113 and the gate insulation layer 112. The first charge source electrode CSE1 and the first charge drain electrode CDE1 may be comprised of an electrically conductive material, e.g., copper (Cu), aluminum (Al), molybdenum (Mo), nickel (Ni), titanium (Ti), chromium (Cr) or an alloy thereof, but not limited thereto.

The second charge transistor CT2 comprising a second charge active layer CACT2, a second charge gate electrode CGE2, a second charge source electrode CSE2 and a second charge drain electrode CDE2 is disposed on the buffer layer 111.

The second charge active layer CACT2 is disposed on the buffer layer 111. The second charge active layer CACT2 may be made of a semiconductor material such as oxide semiconductor, amorphous silicon or polysilicon and the like, but not limited thereto.

The gate insulation layer 112 is disposed on the second charge active layer CACT2, and the second charge gate electrode CGE2 is disposed on the gate insulation layer 112. The second charge gate electrode CGE2 may connect to the second selection line SEL2 electrically. The second charge gate electrode CGE2 may be made of an electrically conductive material, e.g., copper (Cu), aluminum (Al), molybdenum (Mo), nickel (Ni), titanium (Ti), chromium (Cr) or an alloy thereof, but not limited thereto.

The first interlayer insulation layer 113 and the second interlayer insulation layer 114 are disposed on the second charge gate electrode CGE2, and the second charge source electrode CSE2 and the second charge drain electrode CDE2 are disposed on the second interlayer insulation layer 114. The second charge source electrode CSE2 may connect to the data pad DP electrically, and the second charge drain electrode CDE2 may connect to the 1-2 data line DL1*b*, the 2-2 data line DL2*b* and the 3-2 data line DL3*b* electrically. Additionally, the second charge source electrode CSE2 and the second charge drain electrode CDE2 may connect to the second charge active layer CACT2 electrically, through the contact holes of the second interlayer insulation layer 114, the first interlayer insulation layer 113 and the gate insulation layer 112. The second charge source electrode CSE2 and the second charge drain electrode CDE2 may be made of an electrically conductive material, e.g., copper (Cu), aluminum (Al), molybdenum (Mo), nickel (Ni), titanium (Ti), chromium (Cr) or an alloy thereof, but not limited thereto.

The first discharge transistor DCT1 comprising a first discharge active layer DCACT1, a first discharge gate electrode DCGE1, a first discharge source electrode DCSE1 and a first discharge drain electrode DCDE1 is disposed on the buffer layer 111.

The first discharge active layer DCACT1 is disposed on the buffer layer 111. The first discharge active layer DCACT1 may be made of a semiconductor material such as oxide semiconductor, amorphous silicon or polysilicon and the like, but not limited thereto.

The gate insulation layer 112 is disposed on the first discharge active layer DCACT1, and the first discharge gate electrode DCGE1 is disposed on the gate insulation layer 112. The first discharge gate electrode DCGE1 may connect to the second selection line SEL2 electrically. The first discharge gate electrode DCGE1 may be made of an electrically conductive material, e.g., copper (Cu), aluminum (Al), molybdenum (Mo), nickel (Ni), titanium (Ti), chromium (Cr) or an alloy thereof, but not limited thereto.

The first interlayer insulation layer 113 and the second interlayer insulation layer 114 are disposed on the first discharge gate electrode DCGE1, and the first discharge source electrode DCSE1 and the first discharge drain electrode DCDE1 are disposed on the second interlayer insulation layer 114. The first discharge source electrode DCSE1 may connect to the 1-1 data line DL1*a*, the 2-1 data line DL2*a* and the 3-1 data line DL3*a* electrically, and the first discharge drain electrode DCDE1 may connect to the discharge line DCL electrically. Additionally, the first discharge source electrode DCSE1 and the first discharge drain electrode DCDE1 may connect to the first discharge active layer DCACT1 electrically through the contact holes of the second interlayer insulation layer 114, the first interlayer insulation layer 113 and the gate insulation layer 112. The first discharge source electrode DCSE1 and the first discharge drain electrode DCDE1 may be made of an electrically conductive material, e.g., copper (Cu), aluminum (Al), molybdenum (Mo), nickel (Ni), titanium (Ti), chromium (Cr) or an alloy thereof, but not limited thereto.

The second discharge transistor DCT2 comprising a second discharge active layer DCACT2, a second discharge gate electrode DCGE2, a second discharge source electrode DCSE2 and a second discharge drain electrode DCDE2 is disposed on the buffer layer 111.

The second discharge active layer DCACT2 is disposed on the buffer layer 111. The second discharge active layer DCACT2 may be made of a semiconductor material such as oxide semiconductor, amorphous silicon or polysilicon and the like, but not limited thereto.

The gate insulation layer 112 is disposed on the second discharge active layer DCACT2, and the second discharge gate electrode DCGE2 is disposed on the gate insulation layer 112. The second discharge gate electrode DCGE2 may connect to the first selection line SEL1 electrically. The second discharge gate electrode DCGE2 may be made of an electrically conductive material, e.g., copper (Cu), aluminum (Al), molybdenum (Mo), nickel (Ni), titanium (Ti), chromium (Cr) or an alloy thereof, but not limited thereto.

The first interlayer insulation layer 113 and the second interlayer insulation layer 114 are disposed on the second discharge gate electrode DCGE2, and the second discharge source electrode DCSE2 and the second discharge drain electrode DCDE2 are disposed on the second interlayer insulation layer 114. The second discharge source electrode DCSE2 may connect to the 1-2 data line DL1*b*, the 2-2 data line DL2*b* and the 3-2 data line DL3*b* electrically, and the second discharge drain electrode DCDE2 may connect to the discharge line DCL electrically. Additionally, the second discharge source electrode DCSE2 and the second discharge drain electrode DCDE2 may connect to the second discharge active layer DCACT2 electrically through the contact holes of the second interlayer insulation layer 114, the first interlayer insulation layer 113 and the gate insulation layer 112. The second discharge source electrode DCSE2 and the second discharge drain electrode DCDE2 may be made of an electrically conductive material, e.g., copper (Cu), aluminum (Al), molybdenum (Mo), nickel (Ni), titanium (Ti), chromium (Cr) or an alloy thereof, but not limited thereto.

Then the first selection line SEL1 and the second selection line SEL2 are disposed between the gate insulation layer 112 and the first interlayer insulation layer 113. The first selection line SEL1 may connect to the first charge gate electrode CGE1 and the second discharge gate electrode DCGE2 electrically. For example, the first selection line SEL1, the first charge gate electrode CGE1 and the second discharge gate electrode DCGE2 may be formed integrally. The second selection line SEL2 may connect to the second charge gate electrode CGE2 and the first discharge gate electrode DCGE1 electrically, and for example, the second selection line SEL2, the second charge gate electrode CGE2 and the first discharge gate electrode DCGE1 may be formed integrally.

The discharge line DCL is disposed between the first interlayer insulation layer 113 and the second interlayer insulation layer 114. The discharge line DCL may extend in the row direction, and connect to the first discharge source electrode DCSE1 and the second discharge source electrode DCSE2 electrically. The discharge line DCL may extend in the row direction while the discharge line DCL is disposed between the first charge transistor CT1 and the first discharge transistor DCT1 and between the second charge transistor CT2 and the second discharge transistor DCT2.

A plurality of data lines DL are disposed on the second interlayer insulation layer 114. The plurality of data lines DL may connect to each of the first charge drain electrode CDE1, the second charge drain electrode CDE2, the first discharge drain electrode DCDE1 and the second discharge drain electrode DCDE2 electrically. The first charge drain electrode CDE1 and the first discharge drain electrode DCDE1 may connect to the same data line DL electrically, and the second charge drain electrode CDE2 and the second discharge drain electrode DCDE2 may connect to the same data line DL electrically.

Further, as the width of a channel of the plurality of charge transistors increases, the data line DL may be charged with a data voltage rapidly. As the length of a channel of the plurality of charge transistors decreases, the data line DL may be charged with a data voltage rapidly. Specifically, the channel of the transistor is a part of the active layer overlapping the gate electrode, and the width of the channel corresponds to the width of the gate electrode, and the length of the channel corresponds to the length of the channel, in a direction from the source electrode to the drain electrode. As the width of the channel increases or the length of the channel decreases, resistance decreases, making it easy for current to flow. On the contrary, as the width of the channel decreases, or the length of the channel increases, resistance increases making it hard for current to flow. In the case where a ratio of a width/length value of the channel increases, more current may flow readily through the channel. Accordingly, the width and length of the channel of the plurality of charge transistors may be adjusted to charge the data line DL with a data voltage rapidly.

Thus, the MUX circuit MUX supplying a data voltage to only one of the pair of data lines DL is included in the display device 100 of one embodiment, thereby securing a simplified structure of the data driver DD and a decrease in costs. The MUX circuit MUX may connect the pair of data lines DL with one data pad DP. In the display device 100 of one embodiment, the number of data pads DP for supplying a data voltage to the plurality of data lines DL may be half of the number of data pads DP in a display device where one data line DL connects to one data pad DP. Additionally, as the number of data pads DP decreases, the number of channels of the data driver DD supplying a data voltage to the plurality of data pads DP may decrease. Accordingly, a simplified structure of the data driver DD and a decrease in costs may be ensured. Thus, the MUX circuit MUX connecting the plurality of data lines DL with one data pad DP is formed in the display device 100 of one embodiment, so that a decrease in the number of channels and a simplified structure of the data driver DD may be ensured, thereby reducing costs and enhancing yields.

Figure 9:
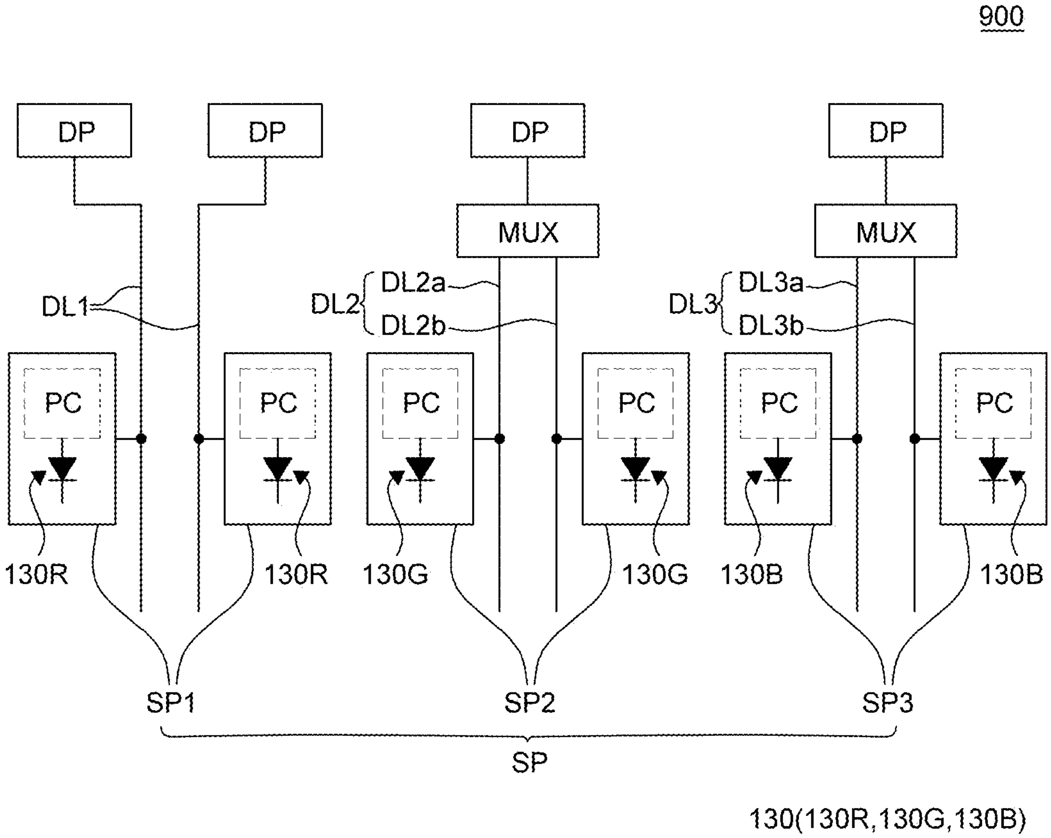
FIG. 9 is a schematic block diagram of a sub pixel and a MUX circuit of a display device of another embodiment.

FIG. 9 is a schematic block diagram of a sub pixel and a MUX circuit MUX of a display device of another embodiment. A display device 900 of FIG. 9 and the display device 100 of FIGS. 1-8 are substantially identical except for a first sub pixel SP1 and a first data line DL1, and accordingly, the identical elements are not described.

Referring to FIG. 9, each of a plurality of first data lines DL1 may connect to each of a plurality of first sub pixels SP1 and supply a data voltage to each of the plurality of first sub pixels SP1. At this time, the plurality of first data lines DL1 may directly connect to the plurality of data pads DP and be supplied with a data voltage. All of the plurality of first data lines DL1 may connect to a different data pad DP and be supplied with a data voltage individually. At this time, a data voltage may be supplied to all of the plurality of first data lines DL1 for one frame period, and all of the plurality of first sub pixels SP1 may be driven together.

In contrast, a plurality of second data lines DL2 and a plurality of third data lines DL3 may connect to the MUX circuit MUX, and a data voltage may be supplied only to a part of the second data lines DL2 and a part of the third data lines DL3 selectively for one frame period.

Additionally, a first light emitting diode 130R disposed in the first sub pixel SP1 is a red light emitting diode and has an advantage in low current driving over a second light emitting diode 130G and a third light emitting diode 130B that are green and blue light emitting diodes. For example, even though identical driving current is supplied to the plurality of light emitting diodes 130, the first light emitting diode 130R as a red light emitting diode may be driven more readily than the second light emitting diode 130G as a green light emitting diode and the third light emitting diode 130B as a blue light emitting diode, and may reduce the possibility of a failure in driving further than the second light emitting diode 130G as a green light emitting diode and the third light emitting diode 130B as a blue light emitting diode. Thus, a data voltage is supplied at the same time to the first sub pixel SP1 comprising the first light emitting diode 130R which is advantageous in low current driving, to display a low gradation image.

Then the MUX circuit MUX may be disposed only in an area between the plurality of second data lines DL2 and the plurality of data pads DP and in an area between the plurality of third data lines DL3 and the plurality of data pads DP, in the non-active area NA. In contrast, the MUX circuit MUX may not be disposed in an area between the plurality of first data lines DL1 and the plurality of data pads DP in the non-active area NA. Accordingly, instead of the MUX circuit MUX, other elements of the display device 900 may be further disposed in an area between the plurality of first data lines DL1 and the plurality of data pads DP. For example, a static electricity prevention circuit is disposed in an area between the plurality of first data lines DL1 and the plurality of data pads DP, to protect the display panel PN from static electricity. Thus, a vacant space which is without the MUX circuit MUX and which is between the plurality of first data lines DL1 and the plurality of data pads DP helps to ensure efficient use of the surface area of the non-active area NA.

The exemplary embodiments of the present disclosure can also be described as follows:

According to an aspect of the present disclosure, a display device includes a plurality of sub pixels, a plurality of data lines connected to each of the plurality of sub pixels, and a MUX circuit connected to a pair of adjacent data lines among the plurality of data lines, the MUX circuit includes a charge transistor connected to each of the pair of data lines, and a discharge transistor connected to each of the pair of data lines.

The charge transistor may include a first charge transistor connected between one of the pair of data lines and a data pad, and a second charge transistor connected between a other of the pair of data lines and the data pad.

The discharge transistor may include a first discharge transistor connected between the one data line and a discharge line, and a second discharge transistor connected between the other data line and the discharge line.

The display device may further include a first selection line connected to a gate electrode of the first charge transistor and a gate electrode of the second discharge transistor, and a second selection line connected to a gate electrode of the second charge transistor and a gate electrode of the first discharge transistor.

A first selection signal of the first selectin line and a second selection signal of the second selection line may be signals of a mutually reversed phase.

For a period in which the first selectin signal of a turn-on level is supplied and the second selection signal of a turn-off level is supplied, the one data line may be electrically connected to the data pad through the first charge transistor, and the other data line may be electrically connected to the discharge line through the second discharge transistor.

For a period in which the second selectin signal of a turn-on level is supplied and the first selection signal of a turn-off level is supplied, the one data line may be electrically connected to the discharge line through the first discharge transistor, and the other data line may be electrically connected to the data pad through the second charge transistor.

The plurality of sub pixels may include a pair of first sub pixels adjacent to each other, a pair of second sub pixels adjacent to each other, and a pair of third sub pixels adjacent to each other, at least a part of the pair of first sub pixels, the pair of second sub pixels and the pair of third sub pixels may be driven for a different period.

The plurality of data lines may include a 1-1 data line and a 1-2 data line connected to each of the pair of first sub pixels, and connected to the same MUX circuit, a 2-1 data line and a 2-2 data line connected to each of the pair of second sub pixels, and connected to the same MUX circuit, and a 3-1 data line and a 3-2 data line connected to each of the pair of third sub pixels, and connected to the same MUX circuit.

The plurality of data lines may include a plurality of first data lines connected to each of the pair of first sub pixels, a 2-1 data line and a 2-2 data line connected to each of the pair of second sub pixels, and connected to the same MUX circuit, and a 3-1 data line and a 3-2 data line connected to each of the pair of third sub pixels, and connected to the same MUX circuit.

According to another aspect of the present disclosure, a display device includes a substrate configured to include an active area and a non-active area, a plurality of data lines configured to extend from the non-active area to the active area, a plurality of data pads disposed in the non-active area, and a plurality of MUX circuits disposed in the non-active area, and connected between the plurality of data lines and the plurality of data pads, each of the plurality of MUX circuits includes a plurality of first charge transistors connected to a part of the plurality of data lines, a plurality of second charge transistors connected to a rest of the plurality of data lines, a plurality of first discharge transistor connected to the part of the data lines, and a plurality of second discharge transistors connected to the rest of the data lines, the plurality of first charge transistors and the plurality of first discharge transistors are turned on for a different period, and the plurality of second charge transistors and the plurality of second discharge transistors are turned on for a different period.

Each of the plurality of first charge transistors may include a first charge active layer disposed on the substrate, a first charge gate electrode disposed on the first charge active layer, a first charge source electrode disposed on the first charge gate electrode, and connected to each of the plurality of data pads, and a first charge drain electrode disposed on the first charge gate electrode, and connected to each of the part of the data lines, each of the plurality of second charge transistors may include a second charge active layer disposed on the substrate, a second charge gate electrode disposed on the second charge active layer, a second charge source electrode disposed on the second charge gate electrode, and connected to each of the plurality of data pads, and a second charge drain electrode disposed on the second charge gate electrode, and connected to each of the rest of the data lines.

Each of the plurality of first discharge transistors may include a first discharge active layer disposed on the substrate, a first discharge gate electrode disposed on the first discharge active layer, a first discharge source electrode disposed on the first discharge gate electrode, and connected to each of the part of the data lines, and a first discharge drain electrode disposed on the first discharge gate electrode, and connected to a discharge line, each of the plurality of second discharge transistors may include a second discharge active layer disposed on the substrate, a second discharge gate electrode disposed on the second discharge active layer, a second discharge source electrode disposed on the second discharge gate electrode, and connected to each of the rest of the data lines, and a second discharge drain electrode disposed on the second discharge gate electrode, and connected to the discharge line.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All of the technical concepts in the equivalent scope of the present disclosure should be construed as falling within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a plurality of sub pixels;

a plurality of data lines electrically connected to each of the plurality of sub pixels; and a multiplexer (MUX) circuit electrically connected to a pair of adjacent data lines among the plurality of data lines, wherein the MUX circuit comprises:

a charge transistor electrically connected to each of the pair of adjacent data lines; and a discharge transistor electrically connected to each of the pair of adjacent data lines, wherein the charge transistor comprises:

a first charge transistor electrically connected between one of the pair of adjacent data lines and a data pad; and a second charge transistor electrically connected between the other of the pair of adjacent data lines and the data pad, wherein the discharge transistor comprises:

a first discharge transistor electrically connected between the one data line and a discharge line; and a second discharge transistor electrically connected between the other data line and the discharge line, wherein the display device further comprises:

a first selection line electrically connected to a gate electrode of the first charge transistor and a gate electrode of the second discharge transistor; and a second selection line electrically connected to a gate electrode of the second charge transistor and a gate electrode of the first discharge transistor.

2. The display device of claim 1, wherein a first selection signal of the first selection line and a second selection signal of the second selection line are signals of a mutually reversed phase.

3. The display device of claim 2, wherein for a period in which the first selection signal of a turn-on level is supplied and the second selection signal of a turn-off level is supplied, the one data line is electrically connected to the data pad through the first charge transistor, and the other data line is electrically connected to the discharge line through the second discharge transistor.

4. The display device of claim 2, wherein for a period in which the second selection signal of a turn-on level is supplied and the first selection signal of a turn-off level is supplied, the one data line is electrically connected to the discharge line through the first discharge transistor, and the other data line is electrically connected to the data pad through the second charge transistor.

5. The display device of claim 1, wherein the plurality of sub pixels comprises:

a pair of first sub pixels adjacent to each other;

a pair of second sub pixels adjacent to each other; and a pair of third sub pixels adjacent to each other, and wherein at least a part of the pair of first sub pixels, the pair of second sub pixels, and the pair of third sub pixels are driven for a different period.

6. The display device of claim 5, wherein the plurality of data lines comprises:

a 1-1 data line and a 1-2 data line electrically connected to each of the pair of first sub pixels, and electrically connected to the same MUX circuit;

a 2-1 data line and a 2-2 data line electrically connected to each of the pair of second sub pixels, and electrically connected to the same MUX circuit; and a 3-1 data line and a 3-2 data line electrically connected to each of the pair of third sub pixels, and electrically connected to the same MUX circuit.

7. The display device of claim 5, wherein the plurality of data lines comprises:

a plurality of first data lines electrically connected to each of the pair of first sub pixels;

a 2-1 data line and a 2-2 data line electrically connected to each of the pair of second sub pixels, and electrically connected to the same MUX circuit; and a 3-1 data line and a 3-2 data line electrically connected to each of the pair of third sub pixels, and electrically connected to the same MUX circuit.

8. A display device, comprising:

a substrate including an active area and a non-active area;

a plurality of data lines configured to extend from the non-active area to the active area;

a plurality of data pads disposed in the non-active area; and a plurality of MUX circuits disposed in the non-active area, and electrically connected between the plurality of data lines and the plurality of data pads, wherein each of the plurality of MUX circuits comprises:

a plurality of first charge transistors electrically connected to a part of the plurality of data lines;

a plurality of second charge transistors electrically connected to a rest of the plurality of data lines;

a plurality of first discharge transistor electrically connected to the part of the plurality of data lines; and a plurality of second discharge transistors electrically connected to the rest of the plurality of data lines, wherein the plurality of first charge transistors and the plurality of first discharge transistors are turned on for a different period, and wherein the plurality of second charge transistors and the plurality of second discharge transistors are turned on for a different period, wherein each of the plurality of first charge transistors comprises:

a first charge active layer on the substrate;

a first charge gate electrode on the first charge active layer;

a first charge source electrode on the first charge gate electrode, and electrically connected to each of the plurality of data pads; and a first charge drain electrode on the first charge gate electrode, and electrically connected to each of the part of the plurality of data lines, and wherein each of the plurality of second charge transistors comprises:

a second charge active layer on the substrate;

a second charge gate electrode on the second charge active layer;

a second charge source electrode on the second charge gate electrode, and electrically connected to each of the plurality of data pads; and a second charge drain electrode on the second charge gate electrode, and electrically connected to each of the rest of the plurality of data lines.

9. The display device of claim 8, wherein each of the plurality of first discharge transistors comprises:

a first discharge active layer on the substrate;

a first discharge gate electrode on the first discharge active layer;

a first discharge source electrode on the first discharge gate electrode, and electrically connected to each of the part of the plurality of data lines; and a first discharge drain electrode on the first discharge gate electrode, and electrically connected to a discharge line, and wherein each of the plurality of second discharge transistors comprises:

a second discharge active layer on the substrate;

a second discharge gate electrode on the second discharge active layer;

a second discharge source electrode on the second discharge gate electrode, and electrically connected to each of the rest of the plurality of data lines; and a second discharge drain electrode on the second discharge gate electrode, and electrically connected to the discharge line.

10. The display device of claim 9, further comprising:

a first selection line electrically connected to gate electrodes of the plurality of first charge transistors and gate electrodes of the plurality of second discharge transistors; and a second selection line electrically connected to gate electrodes of the plurality of second charge transistors and gate electrodes of the plurality of first discharge transistors.

11. The display device of claim 10, wherein a first selection signal of the first selection line and a second selection signal of the second selection line are signals of a mutually reversed phase.

* * * * *